US012583793B2

(12) United States Patent
Liu et al.

(10) Patent No.: US 12,583,793 B2
(45) Date of Patent: Mar. 24, 2026

(54) CERAMIC SLATE WITH COLORED JADE EFFECT AND PREPARATION METHOD THEREOF

(71) Applicant: MONALISA GROUP CO., LTD, Foshan City (CN)

(72) Inventors: Yijun Liu, Foshan City (CN); Yuandong Yang, Foshan City (CN); Qiuli Huang, Foshan City (CN); Kelin Zhang, Foshan City (CN)

(73) Assignee: MONALISA GROUP CO., LTD, Foshan City (CN)

( * ) Notice: Subject to any disclaimer, the term of this patent is extended or adjusted under 35 U.S.C. 154(b) by 441 days.

(21) Appl. No.: 18/553,098

(22) PCT Filed: Dec. 3, 2021

(86) PCT No.: PCT/CN2021/135267
§ 371 (c)(1),
(2) Date: Sep. 28, 2023

(87) PCT Pub. No.: WO2022/205988
PCT Pub. Date: Oct. 6, 2022

(65) Prior Publication Data
US 2024/0132407 A1 Apr. 25, 2024
US 2024/0228381 A9 Jul. 11, 2024

(30) Foreign Application Priority Data

Mar. 31, 2021 (CN) .......................... 202110343867.7

(51) Int. Cl.
C04B 35/14 (2006.01)
C03C 3/097 (2006.01)
(Continued)

(52) U.S. Cl.
CPC .............. *C04B 35/14* (2013.01); *C03C 3/097* (2013.01); *C03C 4/02* (2013.01); *C04B 35/622* (2013.01);
(Continued)

(58) Field of Classification Search
CPC ........... C03C 4/02; C03C 3/097; C03C 3/076; C03C 3/083; C04B 35/14
See application file for complete search history.

(56) References Cited

U.S. PATENT DOCUMENTS 5,558,690 A * 9/1996 Hnat ....................... C03B 32/02
65/134.8

FOREIGN PATENT DOCUMENTS

CN 1257777 A 6/2000
CN 101177346 A 5/2008
(Continued)

OTHER PUBLICATIONS

CN110627532, machine translation (Year: 2019).*
CN106927677, machine translation. (Year: 2017).*

*Primary Examiner* — Robert A Vetere
(74) *Attorney, Agent, or Firm* — Alleman Hall LLP

(57) ABSTRACT

The present invention relates to a ceramic slate with a colored jade effect and a preparation method comprising: pressing and forming raw materials containing a ceramic base material and colored glass fragments to obtain a ceramic green body; drying and firing the ceramic green body to give a ceramic slate with colored jade effect particles dispersed on the surface of the green body; wherein, the colored glass fragments account for 3 wt % to 5 wt % of the ceramic base material. Since colored glass waste instead of frits and pigments is used to prepare the ceramic slate with the colored jade effect, the ceramic slate does not have the phenomenon of pigment dispersion after high-temperature firing, and the surface of the fired ceramic slate shows a
(Continued)

shape of micro-protrusion, so that the polished tile surface is smoother and free from pits, resulting in a better tile surface effect.

4 Claims, 1 Drawing Sheet

(51) Int. Cl.
 *C03C 4/02* (2006.01)
 *C04B 35/622* (2006.01)
 *C04B 41/50* (2006.01)

(52) U.S. Cl.
 CPC .. *C04B 41/5022* (2013.01); *C04B 2235/3201* (2013.01); *C04B 2235/3206* (2013.01); *C04B 2235/3208* (2013.01); *C04B 2235/3215* (2013.01); *C04B 2235/3217* (2013.01); *C04B 2235/3241* (2013.01); *C04B 2235/3272* (2013.01); *C04B 2235/34* (2013.01)

(56) References Cited

FOREIGN PATENT DOCUMENTS

| CN | 102390931 A | | 3/2012 | |
| CN | 106927677 A | * | 7/2017 | ............. C03C 3/066 |
| CN | 110627532 A | * | 12/2019 | ............. C04B 35/14 |
| CN | 111635259 A | | 9/2020 | |
| CN | 112341176 A | | 2/2021 | |
| CN | 112500196 A | | 3/2021 | |

* cited by examiner

CERAMIC SLATE WITH COLORED JADE EFFECT AND PREPARATION METHOD THEREOF

TECHNICAL FIELD

The present invention relates to a ceramic slate with colored jade effect and a preparation method thereof, which belong to the technical field of production and manufacturing of architectural ceramics.

BACKGROUND

In recent years, with the rapid development of China's industry, the economic strength of our country has rapidly increased, and people's pursuit of the quality of life has gradually improved, especially with stricter requirements for living environment. As a decorative material for beautifying the living space, architectural ceramic tiles have been widely used in the home decoration industry, and have also undergone significant changes accordingly. The existing architectural ceramic tiles have developed from polished tiles to glazed tiles, and now to color-penetrated tiles, large-size ceramic plates, ceramic slates, and so on. Color-penetrated tiles are highly popular with consumers due to having the advantages of both polished tiles and glazed tiles, while large-size ceramic plates and ceramic slates are becoming increasingly popular in the field of home decoration.

Technical Problem

At present, most of the large-particle ceramic color-penetrated tiles with a stone-like effect in the market are generally achieved by adding frits into ceramic green bodies. These frits come in a large variety and are expensive. In order to achieve a color effect, corresponding pigments need to be added. These pigments are easily dispersed at high temperature, resulting in blurry patterns after firing. In addition, because most of these frits are medium-temperature frits or low-temperature frits, potassium ions and sodium ions quickly melt at high temperature to produce a glass phase, and with the increase of temperature, the green body continuously exhausts gas until it is sintered. Due to a low initial melting point, the area where the frits are arranged undergoes local reactions with the green body, resulting in the continuous discharge of bubbles and shrinkage of the green body. Moreover, the tile surface is prone to locally subside after high-temperature firing. This not only increases the cost, but also has a poor tile surface effect and poor polishing effect, affecting the flatness and aesthetics of the tile surface.

Technical Solution

In view of the problems raised by the background art, the present invention uses colored glass waste instead of frits and pigments to prepare a ceramic slate with a colored jade effect. The ceramic slate does not have the phenomenon of pigment dispersion after high-temperature firing, and the surface of the fired ceramic slate shows a shape of micro-protrusion (slight protrusion), so that the polished tile surface is smoother and free from pits, resulting in a better tile surface effect. The preparation method of the present invention also greatly reduces the cost, turning waste into treasure, thereby replacing expensive frits to prepare a ceramic product with a better effect.

In a first aspect, the present invention provides a preparation method for a ceramic slate with a colored jade effect. The preparation method comprises pressing and forming raw materials containing a ceramic base material and colored glass fragments to obtain a ceramic green body, and drying and firing the ceramic green body to give a ceramic slate with colored jade effect particles dispersed on the surface of the green body.

The reason why the colored glass fragments have color is because their composition contains chromium sesquioxide as a main coloring substance. This substance is extremely stable, has a melting point of about 2,266±25° C. and a boiling point of about 4,000° C., and is generally prepared from chromium oxide at a high temperature above 1,100° C. During the ceramic firing process, the firing temperature usually does not exceed 1,200° C., while the temperature during glass melting is much higher than 1,200° C. Therefore, the colored glass fragments produced through high-temperature glass melting do not vary due to the influence of kiln atmosphere and temperature, and the structure of the colored glass fragments is not damaged during high-temperature ceramic firing. The preparation method of the present invention utilizes the characteristic of that the colored glass fragments can stably exist at high temperature and have no color dispersion, and therefore the obtained ceramic slate has a flat surface and a strong three-dimensional effect after firing. In addition, the use of the crushed glass fragments greatly reduces the production cost, facilitates industrial production, and is beneficial to energy conservation and environmental protection.

The mass percentage of the colored glass fragments to the ceramic base material is controlled at 3 wt % to 5 wt %, so that the stability of production can be ensured while the desired colored jade effect can be achieved, without affecting the original production process. If the mass percentage of the colored glass fragments to the ceramic base material exceeds 5 wt %, the production process will be affected. For example, the uneven distribution of bulk density of the green body in the process of pressing and forming, results in poor strength of the green body, which will affect subsequent conveying, drying and other processes. The main reason for the aforementioned influence is that the pressing and forming of the green body has certain requirements for the powder material, such as particle grading, moisture content, bulk density, etc. The physical and chemical properties of the colored glass fragments are quite different from those of the ceramic base material, so the amount of the colored glass fragments used should not be too much under the premise of meeting the normal process requirements of the green body.

Preferably, the chemical composition of the ceramic base material includes, in percentage by mass: $SiO_2$: 65% to 69%; $Al_2O_3$: 18% to 22%; and alkali metal oxide: 4% to 9%. Excessive alkali metal content can lower the firing temperature of the green body, thereby affecting the water absorption, strength, and tile shape (brick shape) of the green body.

The principle for selecting the colored glass fragments in the present invention is that the colored glass fragments cannot react with the ceramic base material or produce chemical substances that are not conducive to the formation of ceramics, and in addition, the colored glass fragments can stably exist at high temperature and exhibit stable color development. Preferably, the chemical composition of the colored glass fragments includes, in percentage by mass: $SiO_2$: 65% to 70%; $Al_2O_3$: 2% to 4%; alkaline earth metal oxide: 9% to 13%; and alkali metal oxide: 10% to 16%.

Preferably, the maximum firing temperature of the ceramic green body is less than 1200° C., and firing duration is 63 to 105 minutes.

Preferably, the particle size of the colored glass fragments is 6 to 8 mesh.

Preferably, the linear expansion coefficient of the colored glass fragments at 0° C. to 400° C. is $6.8 \times 10^{-6}$ to $7.2 \times 10^{-6}$/K, and the linear expansion coefficient of the ceramic base material at 0° C. to 400° C. is $7.0 \times 10^{-6}$ to $7.8 \times 10^{-6}$/K. The expansion coefficient of the glass fragments is close to the linear expansion coefficient of the ceramic base material, and the difference in linear expansion coefficient between the glass fragments and the ceramic base material at 0° C. to 400° C. is generally controlled at less than or equal to $0.2 \times 10^{-6}$/K to $0.6 \times 10^{-6}$/K, so that after high-temperature firing there will be no cracks between glass particles and the green body due to their mismatching the expansion coefficients, which will affect the decorative effect.

Preferably, before pressing and forming, the ceramic base material is first applied, and then the colored glass fragments are applied on the upper layer of the ceramic base material. Preferably, the colored glass fragments are positionally applied on the upper layer of the ceramic base material.

In a second aspect, the present invention further provides a ceramic slate with a colored jade effect obtained by any of the above mentioned preparation method. In some embodiments, the surface of the ceramic slate has micro-protrusions with a height of less than 0.2 mm. The height of the micro-protrusions is preferably 0.1 mm to 0.2 mm.

The specifications of the aforementioned ceramic slate may be a width of 600 mm to 1,600 mm, a length of 600 mm to 3,600 mm, and a thickness of 9.5 mm to 15 mm.

DETAILED DESCRIPTION OF PREFERRED EMBODIMENTS

Figure 1:
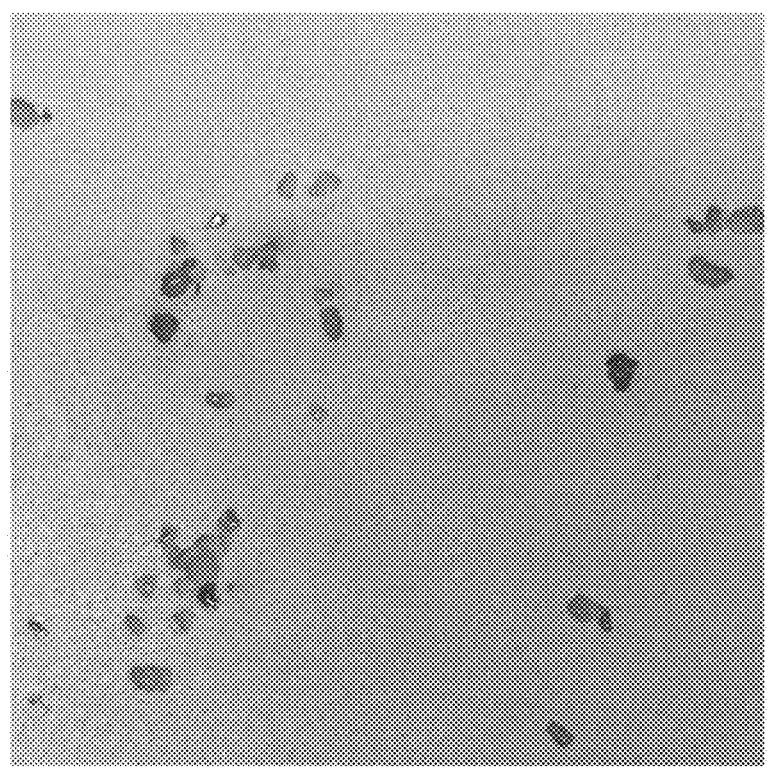
FIG. 1 is a tile surface effect picture according to Example 1.

The present invention will be further illustrated by the following embodiments, and it should be understood that the following embodiments are only used to illustrate the present invention rather than to limit it. Unless otherwise specified, each percentage refers to the mass percentage. In the absence of specific explanation in the present invention, a "colored glass fragment" may also be called a "glass fragment" or a "glass particle."

The preparation method for a ceramic slate with a colored jade effect according to the present invention is illustrated exemplarily hereinafter.

A ceramic base material is prepared. The chemical composition of the ceramic base material only needs to meet the production process for the ceramic slate. In some embodiments, the chemical composition of the ceramic base material includes, in percentage by mass: $SiO_2$: 65% to 69%; $Al_2O_3$: 18% to 22%; and alkali metal oxide: 4% to 9%. As an example, the chemical composition of the ceramic base material may include, in percentage by mass: $SiO_2$: 65% to 69%; $Al_2O_3$: 18% to 22%; $Fe_2O_3$: 0.2% to 0.4%; $TiO_2$: 0.01% to 0.2%; CaO: 0.3% to 0.5%; MgO: 0.5% to 0.9%;

$K_2O$: 2% to 4%; $Na_2O$: 2% to 5%; $ZrO_2$: 0.2% to 0.5%; $P_2O_5$: 0.1% to 0.2%; $SO_3$: 0.1% to 0.2%; and loss on ignition: 3% to 5%.

The raw material formula of the ceramic base material may be obtained by adjusting its composition of raw materials according to chemical composition, such as choosing potassium feldspar, nepheline, ball clay, bentonite, black talc, and bauxite for blending. The ceramic base material may be prepared by the following process: mixing and ball-milling 100% of (mineral) raw materials, 40% to 50% of water and 0.1% to 0.5% of sodium tripolyphosphate to give a mixture, and sieving the mixture to form a slurry. The ball milling time may be 5 to 10 minutes. The slurry has a sieve residue of less than or equal to 1 wt % by a 325-mesh sieve. The aforementioned slurry is dried and then crushed to form the ceramic base material with a moisture content of less than or equal to 9 wt %. The moisture content of the ceramic base material within the aforementioned range is conductive to formation.

The colored glass fragments are applied on the surface of the ceramic base material. Preferably, the positionally applying method is adopted. That is, according to the requirement for the tile surface effect, colored glass fragments are applied at the appropriate location. For example, based on the tile surface effect, glue is sprayed at corresponding positions on the surface of the ceramic base material, the colored glass fragments are then spread, and superfluous colored glass fragments are removed by a fan. The color of the colored glass fragments may be green, red, etc.

The chemical composition of the colored glass fragments may include, in percentage by mass: $SiO_2$: 65% to 70%; $Al_2O_3$: 2% to 4%; alkaline earth metal oxide: 9% to 13%; and alkali metal oxide: 10% to 16%. As an example, the chemical composition of the colored glass fragments includes, in percentage by mass: $SiO_2$: 65% to 70%; $Al_2O_3$: 2% to 4%; $Fe_2O_3$: 0.2% to 0.4%; CaO: 8% to 10%; MgO: 1% to 2%; $K_2O$: 0.5% to 1%; $Na_2O$: 10% to 15%; $P_2O_5$ 0.2% to 0.4%; BaO: 0.1% to 0.3%; $Cr_2O_3$: 0.1% to 0.2%; and $SO_3$: 0.1% to 0.2%. The $Fe_2O_3$ content in the aforementioned colored glass fragments is very low, and there is almost no $TiO_2$, which prevents the generation of black spots or yellow spots to ensure the decorative effect of the green body.

The temperature during glass melting (including the refining stage and homogenization stage of glass) is usually higher than 1,200° C., and may reach 1,200° C. to 1,300° C., or even 1,200° C. to 1,600° C. The firing temperature of the ceramic base material (i.e., the firing temperature for preparing the ceramic slate) is lower than the melting temperature of glass particles. In the firing process of the ceramic base material at a high temperature, the glass particles do not form a large number of gas bubbles in the glass particles due to over firing at this temperature. So that there will not be a lot of pores on the brick surface in the process of polishing, and therefore the antifouling effect of the brick surface will not be affected, and the decorative effect of the brick surface is also better. In addition, at the firing temperature of the ceramic base material, the glass fragments in the ceramic green body do not reach a "boiling" state due to low temperature. If the "boiling" state occurs, the softened particle material will be dispersed to other positions beyond the original position of the particles, causing a decrease in the content of the particle material at the original position, and as a result, depressions will be formed at the original position to a certain degree during cooling. Since the glass particle does not come into the "boiling" state due to low temperature, thus such depressions can be avoided. In addition, the firing of the glass particle belongs to secondary firing, with a small loss on ignition and small volume change before and after firing. While the firing of the ceramic base material belongs to raw material firing, the loss on ignition of the ceramic base material after high-temperature firing is greater than that of the glass particle. Therefore, even if the overall volume of the green body decreases, the small volume change of the glass particle prevents the brick surface from forming dents after high-temperature firing.

The fineness of the colored glass fragments only needs to meet the production process requirements such as formability. The particle size of the colored glass fragments may be adjusted according to the size and thickness specifications of the green body. For example, for a green body with a large thickness, the particle size of the glass fragment particles may be appropriately increased. The particle size of the colored glass fragments is preferably 6 to 8 mesh. When the particle size of the colored glass fragments is too small, it may lead to the reaction between the colored glass fragments and the ceramic base material at high temperature, affecting the color effect. When the particle size of the colored glass fragments is too large, it may lead to nonuniform density distribution of the green body due to uneven distribution of the particle and the ceramic base material during the formation of the green body, ultimately resulting in defects in the finished product, such as rotten tiles and cracks.

In some embodiments, the proportion amount of the colored glass fragments used is controlled at 3 wt % to 5 wt % of the ceramic base material.

After applying (spreading) is completed, pressing and forming is carried out to obtain a ceramic green body. The ceramic green body is dried. The drying time may be 1.5 to 2 hours. The moisture content of the dried ceramic green body is controlled within 0.3 wt % to 0.5 wt %.

The ceramic green body is dried and fired to obtain the ceramic slate with the colored jade effect. The drying time may be 10 minutes. The maximum firing temperature of the ceramic slate is below 1,200° C. For example, the maximum firing temperature may be 1,183° C. to 1,190° C., and the firing duration may be 63 to 105 minutes.

In some embodiments, a pattern is printed on the surface of the ceramic green body by ink-jet printing before firing. Ink permeates into the dried ceramic green body and forms the pattern on the surface of the green body, so that the decorative effect of the ceramic slate can be enriched.

After being taken out of the kiln for firing, the fired ceramic slate may be polished, edged, graded, packaged, and warehoused as required. For example, resilient grinding blocks are used for polishing. The grinding blocks for polishing may be arranged into four sets of 240-mesh grinding blocks, eight sets of 300-mesh grinding blocks, eight sets of 400-mesh grinding blocks, four sets of 600-mesh grinding blocks, four sets of 800-mesh grinding blocks, four sets of 1000-mesh grinding blocks, four sets of 1500-mesh grinding blocks, four sets of 2000-mesh grinding blocks, and eight sets of 3000-mesh grinding blocks.

Due to the fact that the color of the colored glass fragments does not change after firing, it can be seen that the colored jade effect particles are distributed on the surface of the ceramic green body after polishing. The size of the colored jade effect particles may reach 2 mm to 4 mm (corresponding to 6 to 8 mesh).

The present invention is intended to protect the use of the colored glass fragments in the ceramic slate with the colored jade effect, and it should be understood that the applying method should not limit the present invention. The ceramic green body may also be formed in other ways. For example, the colored glass fragments are added to the ceramic base material and homogeneously mixed to give a mixture, and the mixture is then spread and shaped by a press to form the ceramic green body. Alternatively, the colored glass fragments may be made into dry particles, which are then added into the ceramic base material and homogeneously mixed to give a mixture, and the mixture is then spread preferably by adopting positional applying and shaped by a press to form the ceramic green body.

Examples will be given to further illustrate the present invention in detail below. It should also be understood that the following examples are only used to further illustrate the present invention rather than to limit the protection scope of the present invention. All non-essential improvements and adjustments which are made by those skilled in the art according to the above contents of the present invention shall fall within the protection scope of the present invention. The specific technological parameters of the following examples are merely one example in an appropriate range, that is, those skilled in the art can make choices within the appropriate range through the description herein, but the choices are not limited to the specific values of the following examples.

Example 1

(1) A ceramic base material was prepared. The chemical composition of the ceramic base material includes, in percentage by mass: $SiO_2$: 66.04%; $Al_2O_3$: 20.29%; $Fe_2O_3$: 0.38%; $TiO_2$: 0.16%; $CaO$: 0.39%; $MgO$: 0.62%; $K_2O$: 3.15%; $Na_2O$: 3.36%; $ZrO_2$: 0.46%; $P_2O_5$: 0.13%; $SO_3$: 0.19%; and loss on ignition: 4.79%. 100% of dry materials (i.e., all the base mineral materials of the ceramic base material), 50% of water, and 0.5% of sodium tripolyphosphate were mixed with a ball mill for 6 minutes to give a mixture. The mixture was sieved with a sieve residue of less than or equal to 1 wt % on a 325-mesh sieve and dried to form the ceramic base material. The moisture content of the ceramic base material was less than or equal to 9 wt %.

(2) A ceramic green body was formed. A double loaded technic was used to form a ceramic body. The ceramic base material was spread first, and then the colored glass fragments accounting for 3 wt % to 5 wt % of the ceramic base material were spread on the surface of the ceramic base material. The ceramic base material and the colored glass fragments were pressed to form the ceramic green body. The chemical composition of the colored glass fragments includes, in percentage by mass: $SiO_2$: 68.40%; $Al_2O_3$: 3.43%; $Fe_2O_3$: 0.35%; $CaO$: 9.07%; $MgO$: 1.37%; $K_2O$: 0.88%; $Na_2O$: 14.1%; $P_2O_5$: 0.36%; $BaO$: 0.23%; $Cr_2O_3$: 0.16%; and $SO_3$: 0.16%. The particle size of the colored glass fragments was 6 to 8 mesh.

(3) The ceramic green body was dried in a kiln. The drying time was 1.5 to 2.0 hours, and the moisture content of the dried ceramic green body was within 0.3 wt % to 0.5 wt %.

(4) A designed pattern was printed on the surface of the ceramic green body by inkjet printing.

(5) The ceramic green body with the inkjet printed designed pattern was dried in the kiln for 10 minutes.

(6) Firing was carried out in the kiln. The maximum firing temperature was 1,190° C., and the firing duration was 63 minutes.

(7) Polishing and grading were carried out. The product was taken out of the kiln and polished by using resilient grinding blocks. The grinding blocks were arranged into four sets of 240-mesh grinding blocks, eight sets of 300- mesh grinding blocks, eight sets of 400-mesh grinding blocks, four sets of 600-mesh grinding blocks, four sets of 800-mesh grinding blocks, four sets of 1000-mesh grinding blocks, four sets of 1500-mesh grinding blocks, four sets of 2000-mesh grinding blocks, and eight sets of 3000-mesh grinding blocks.

(8) The product was packaged and warehoused.

It can be seen from FIG. 1 that after polishing, jade effect particles are distributed on the surface of the green body and the particle effect is transparent, achieving a better effect of texture and administrative levels.

Example 2

This example is substantially the same as Example 1, except that the chemical composition of the ceramic base material includes, in percentage by mass: $SiO_2$: 65%; $Al_2O_3$: 18%; $Fe_2O_3$: 0.2%; $TiO_2$: 0.01%; CaO: 0.3%; MgO: 0.5%; $K_2O$: 2%; $Na_2O$: 2%; $ZrO_2$: 0.2%; $P_2O_5$: 0.1%; $SO_3$ 0.1%; and loss on ignition: 3%.

Example 3

This example is substantially the same as Example 1, except that the chemical composition of the ceramic base material includes, in percentage by mass: $SiO_2$: 69%; $Al_2O_3$: 22%; $Fe_2O_3$: 0.4%; $TiO_2$: 0.2%; CaO: 0.5%; MgO: 0.9%; $K_2O$: 4%; $Na_2O$: 5%; $ZrO_2$: 0.5%; $P_2O_5$: 0.2%; $SO_3$: 0.2%; loss on ignition: 5%.

Comparative Example 1

This comparative example is substantially the same as in Example 1, except that colored frit was used instead of glass particle. The colored frit is composed of a common transparent frit and a pigment. The chemical composition of the colored frit includes, in percentage by mass: $SiO_2$: 50.61%; $Al_2O_3$: 2%; $Fe_2O_3$: 0.5%; CaO: 8%; MgO: 8.5%; $K_2O$: 5%; $Na_2O$: 10%; ZnO: 5%; BaO: 4.23%; $CeO_2$: 5%; $SO_3$: 0.16%; and loss on ignition: 1%. The expansion coefficient of the colored frit at 0° C. to 400° C. is $5 \times 10^{-6}$/K to $6 \times 10^{-6}$/K.

Figure 2:
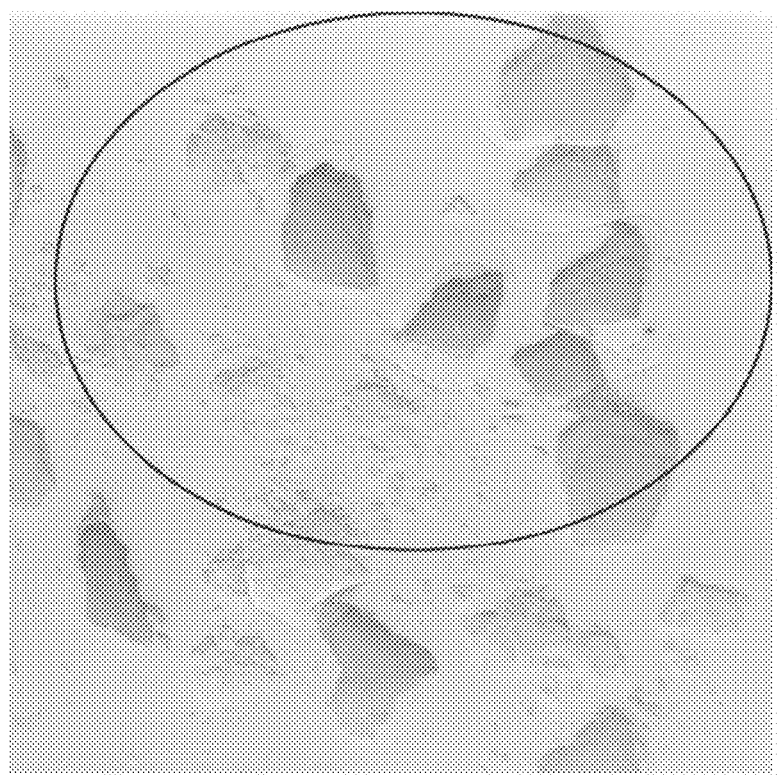
FIG. 2 is a tile surface effect picture according to Comparative Example 1.

It can be seen from FIG. 2 that there are depressions on the tile surface, and cracks appear at the place where particles are applied. The temperature of the colored frit is lower than that of the glass particle, and the composition of the frit contains zinc oxide and the alkali metal content is higher than that of the glass particle. During the high temperature firing process of the green body, the frit produces a phenomenon of "boiling." The liquid phase generated by the frit disperses to the surrounding location at the high temperature, which leads to a decrease in the content of the frit at the original position, resulting in the formation of a depression phenomenon. It can also be seen from FIG. 2 that the transparency of the tile surface is poor, with a hazy (dimming) feeling in the eyes when seeing the tile surface, which is related to the "boiling" of the frit particle at the high temperature. At the high temperature, a large amount of gas is generated in the liquid phase of the frit, similar to the condition when water is boiling. After cooling, the gas is trapped in the form of gas bubbles, and light scattering occurs when it passes through the gas bubbles. As a result, the transparency of the tile surface becomes worse. In addition, it can be seen from the picture of Comparative Example 1 that there are cracks at the location where the frits are spread, which is caused by the improper matching of the expansion coefficient between the frit and the ceramic base material. Due to the small expansion coefficient of the frit, the volume change of the frit after high temperature cooling is small. While the volume of the green body greatly shrinks after high temperature cooling, a decrease in the volume of the green body results due to the large expansion coefficient of the green body and the presence of loss on ignition, etc. That is to say, the volume of the original position where the frits are applied decreases. However, the volume of the fired frit particle is greater than the volume given by the corresponding position of the fired green body, which causes a certain degree of compression between the frit particle and the green body, resulting in cracks on the brick surface after cooling.

What is claimed is:

1. A preparation method for a ceramic slate with a colored jade effect, comprising:

pressing and forming raw materials containing a ceramic base material and colored glass fragments to obtain a ceramic green body, wherein the colored glass fragments account for 3 wt % to 5 wt % of the ceramic base material;

the chemical composition of the ceramic base material includes, in percentage by mass:

$SiO_2$: 65% to 69%; $Al_2O_3$: 18% to 22%; and alkali metal oxide: 4% to 9%; the colored glass fragments have a particle size of 6 to 8 mesh and the chemical composition of the colored glass fragments includes, in percentage by mass: $SiO_2$: 65% to 70%; $Al_2O_3$: 2% to 4%; $Fe_2O_3$: 0.2% to 0.4%; CaO: 8% to 10%; MgO: 1% to 2%; $K_2O$: 0.5% to 1%; $Na_2O$: 10% to 15%; $P_2O_5$ 0.2% to 0.4%; BaO: 0.1% to 0.3%; $Cr_2O_3$: 0.1% to 0.2%; and $SO_3$: 0.1% to 0.2%;

the linear expansion coefficient of the colored glass fragments at 0° C. to 400° C. is $6.8 \times 10^{-6}$/K to $7.2 \times 10^{-6}$/K, the linear expansion coefficient of the ceramic base material at 0° C. to 400° C. is $7.0 \times 10^{-6}$/K to $7.8 \times 10^{-6}$/K, and a difference in linear expansion coefficient between the colored glass fragments and the ceramic base material at 0° C. to 400° C. is not greater than $0.2 \times 10^{-6}$/K to $0.6 \times 10^{-6}$/K;

drying and firing the ceramic green body; and polishing the fired ceramic green body taken out of the kiln to give the ceramic slate with a colored jade effect;

wherein after polishing, particles with colored jade effect are distributed on the surface of the ceramic body; and the ceramic slate does not have pigment dispersion and has micro-protrusions with a height of less than 0.2 mm on the surface of the ceramic slate.

2. The preparation method according to claim 1, wherein the maximum firing temperature of the ceramic green body is less than 1,200° C., and the firing duration is 63 to 105 minutes.

3. The preparation method according to claim 1, wherein before pressing and forming, the ceramic base material is applied first, and then the colored glass fragments are applied on an upper layer of the ceramic base material.

4. The preparation method according to claim 3, wherein the colored glass fragments are positionally applied on the upper layer of the ceramic base material.

* * * * *